(12) United States Patent
Son et al.

(10) Patent No.: US 8,409,306 B2
(45) Date of Patent: Apr. 2, 2013

(54) FUEL REFORMER

(75) Inventors: In-Hyuk Son, Suwon-si (KR);
Woo-Cheol Shin, Suwon-si (KR);
Sung-Chul Lee, Suwon-si (KR);
Jin-Goo Ahn, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 226 days.

(21) Appl. No.: 12/656,404

(22) Filed: Jan. 28, 2010

(65) Prior Publication Data
US 2010/0226834 A1 Sep. 9, 2010

(30) Foreign Application Priority Data

Mar. 3, 2009 (KR) .................. 10-2009-0017928

(51) Int. Cl.
*B01J 7/00* (2006.01)
*B01J 8/00* (2006.01)
*C01B 6/24* (2006.01)
*C01B 3/02* (2006.01)

(52) U.S. Cl. ............ 48/61; 422/625; 422/626; 422/627; 422/630; 423/644; 423/648.1; 423/650

(58) Field of Classification Search ...... 48/61; 422/625, 422/626, 627, 630; 423/644, 648.1, 650
See application file for complete search history.

(56) References Cited

U.S. PATENT DOCUMENTS

| | | | |
|---|---|---|---|
| 3,909,299 A * | 9/1975 | Corrigan | .................. 422/629 |
| 6,514,472 B2 | 2/2003 | Menacherry et al. | |
| 6,814,944 B1 | 11/2004 | Matsui et al. | |
| 7,270,688 B2 * | 9/2007 | Childress et al. | .................. 48/61 |
| 7,662,350 B2 | 2/2010 | Lee et al. | |
| 2004/0265224 A1 * | 12/2004 | Papavassiliou et al. | ...... 423/651 |
| 2005/0005520 A1 * | 1/2005 | Faur-Ghenciu et al. | ..... 48/198.3 |
| 2005/0238574 A1 | 10/2005 | Moon et al. | |
| 2006/0143983 A1 * | 7/2006 | Matsui et al. | .................. 48/61 |
| 2008/0268301 A1 | 10/2008 | Lee et al. | |

FOREIGN PATENT DOCUMENTS

| | | | |
|---|---|---|---|
| JP | 2005 213133 | * | 8/2005 |
| JP | 2005-213133 A | | 8/2005 |
| JP | 2006-213565 A | | 8/2006 |
| KR | 10-2001-0104711 A | | 11/2001 |
| KR | 10-2005-0103568 A | | 11/2005 |
| KR | 10 2007-0042657 A | | 4/2007 |
| KR | 10-0823515 B1 | | 4/2008 |
| WO | WO-2009/101434 | * | 8/2009 |

OTHER PUBLICATIONS

Korean Notice of Allowance in KR 10-2009-0017928, dated Nov. 29, 2010 (Son, et al.).

* cited by examiner

*Primary Examiner* — Matthew Merkling
(74) *Attorney, Agent, or Firm* — Lee & Morse, P.C.

(57) ABSTRACT

A fuel reformer including a reaction container including a first chamber, a first reactor in the first chamber, the first reactor, including a first catalyst, being configured to produce a first reformate by performing a steam reforming reaction on a first fuel, and having a first gas hourly space velocity (GHSV) at a set flow rate, a first heat source thermally connected to the first reactor, and a second reactor connected to the first reactor, the second reactor including a second catalyst, being configured to produce a second reformate having a lower carbon monoxide content than the first reformate, and having a second GHSV greater than the first GHSV at the set flow rate.

16 Claims, 5 Drawing Sheets

Table 1 : Composition, Temperature, and Flow rates of Examples.

| Second Reformate R1 Composition (%) | | | | Temp. (°C) | | | L/min | Conditions (sccm) | | | |
|---|---|---|---|---|---|---|---|---|---|---|---|
| CO | CO₂ | CH₄ | H₂ | S-HTS | Second H/S | SR out | Second Reformate R1 | Air | First Fuel | Second Fuel | Water |
| 8.7 | 14.20 | 0.33 | 76.8 | 600 | 647 | 464 | 8.3 | 19 | 600 | 500 | 6 |
| 7.0 | 17.26 | 0.38 | 76.7 | 650 | 650 | 467 | 8.4 | 19 | 600 | 488 | 6 |
| 5.6 | 18.23 | 0.41 | 77.1 | 700 | 650 | 469 | 8.6 | 19 | 600 | 500 | 6 |
| 6.4 | 17.70 | 0.40 | 76.9 | 750 | 650 | 467 | 8.5 | 19 | 600 | 487 | 6 |
| 7.4 | 16.80 | 0.42 | 77.0 | 800 | 650 | 468 | 8.4 | 19 | 600 | 480 | 6 |
| 8.7 | 15.90 | 0.42 | 76.8 | 850 | 650 | 468 | 8.3 | 19 | 600 | 486 | 6 |

FUEL REFORMER

BACKGROUND

1. Field

Embodiments relate to a fuel reformer.

2. Description of the Related Art

A fuel cell is a high-efficiency electric power generation system which may directly convert chemical energy into electric energy. To convert chemical energy into electric energy, the fuel cell requires hydrogen gas. The fuel cell is eco-friendly because the quantity of pollutants exhausted may be very low. Accordingly, a fuel cell has come into the spotlight as a next-generation, clean energy source.

The process of producing hydrogen gas using, e.g., syngas or natural gas, may include several steps. A reformate containing carbon monoxide and hydrogen gas may be obtained in a reforming reaction performed at about 800° C. Additional hydrogen gas may then be produced by reacting the carbon monoxide in the reformate with steam. Such a reaction is referred to as a water gas shift (WGS) reaction, and the WGS reaction is expressed by the following Reaction Formula 1:

$$CO + H_2O \leftrightarrow CO_2 + H_2 \qquad (1).$$

SUMMARY

Embodiments are therefore directed to a fuel reformer, which substantially overcomes one or more of the problems due to the limitations and disadvantages of the related art.

It is therefore a feature of an embodiment to provide a fuel reformer capable of decreasing the volume and catalyst quantity of a low-temperature water gas shift (WGS) reactor.

It is therefore another feature of an embodiment to provide a fuel reformer having improved performance and efficiency as well as a small size.

At least one of the above and other features and advantages may be realized by providing a fuel reformer including a reaction container including a first chamber, a first reactor in the first chamber, the first reactor including a first catalyst, being configured to produce a first reformate by performing a steam reforming reaction on a first fuel, and having a first gas hourly space velocity (GHSV) at a set flow rate, a first heat source thermally connected to the first reactor, and a second reactor connected to the first reactor, the second reactor including a second catalyst, being configured to produce a second reformate having a lower carbon monoxide content than the first reformate, and having a second GHSV greater than the first GHSV at the set flow rate.

The second catalyst may include an additive, the additive including at least one of cesium, magnesium, potassium, calcium, and fluorine.

The second GHSV may be about 220,000/hr to about 240,000/hr and the first GHSV may be about 2,000/hr to about 40,000/hr, and the second reactor may receive all output of the first reactor.

The second reactor may have a reaction temperature of about 600° C. to about 850° C.

The first fuel may be a liquefied gas hydrocarbon-based fuel that is in a gaseous state at standard temperature and pressure.

The first fuel may include a majority of at least one of methane, ethane, propane, and butane.

The fuel reformer may further include a second heat source thermally connected to the second reactor, wherein the second reactor is disposed outside the reaction container.

The second reactor may be disposed adjacent to the first reactor and thermally connected to the first heat source.

The first or second catalyst may be formed of unit catalysts having a pellet shape.

The first or second catalyst may include a monolithic support body coated with a catalyst material.

The second catalyst may include a platinum main catalyst, a cerium promoter, and magnesium and potassium additives.

The fuel reformer may further include a third reactor connected to the second reactor, the third reactor including a third catalyst, being configured to produce a third reformate having a lower carbon monoxide content than the second reformate, and having a third GHSV lower than the second GHSV at the set flow rate.

The third GHSV may be about 2,000/hr to about 40,000/hr, and the third reactor may receive all output of the second reactor.

The third reactor may have a reaction temperature of about 150° C. to 250° C.

The fuel reformer may further include a heat exchanger disposed between the second and third reactors.

The third catalyst may include a majority of at least one of copper, zinc oxide, and aluminum oxide.

The fuel reformer may further include a reformate purifier connected to the third reactor.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2009-0017928, filed on Mar. 3, 2009, in the Korean Intellectual Property Office, and entitled: "Fuel Reformer," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together; both A and C together; both B and C together; and all three of A, B, and C together. Further, these expressions are open-ended, unless expressly designated to the contrary by their combination with the term "consisting of." For example, the expression "at least one of A, B, and C" may also include an $n^{th}$ member, where n is greater than 3, whereas the expression "at least one selected from the group consisting of A, B, and C" does not.

In the following detailed description, only certain exemplary embodiments have been shown and described, simply by way of illustration. Also, when an element is referred to as being "connected to" another element, it can be directly connected to the another element or be indirectly connected to the another element with one or more intervening elements interposed therebetween.

High-temperature-type fuel cells, e.g., molten carbonate fuel cells and solid oxide fuel cells, which may operate at about 600° C. or higher, and middle-temperature-type fuel cells, e.g., phosphoric acid fuel cells, which may operate at about 200° C. or higher, have been developed to be used for, e.g., large-scale power generation, bio gas plants, and the like. On the other hand, polymer electrolyte fuel cells (PEFCs) employing a polymer electrolyte layer, which may operate in a low-temperature region of about 100° C. or lower, have been developed to be used for, e.g., transportation, household, and portable power sources.

PEFC systems may include, e.g., a system directly using a hydrogen gas or a reformer-based system using a hydrocarbon-based fuel to generate hydrogen gas. A fuel reformer may convert, e.g., a hydrocarbon-based fuel or an alcohol-based fuel, into a composition of hydrogen gas, carbon monoxide, carbon dioxide, etc. (hereinafter, referred to as a reformate), through a reforming reaction. The hydrocarbon-based fuel may include, e.g., liquefied natural gas (LNG), liquefied propane gas (LPG), diesel fuel, and the like. The alcohol-based fuel may include, e.g., butyl alcohol and the like. Steam or air may be used as an oxidizer for the reforming reaction.

The WGS reaction is a catalyzed, reversible reaction, and the conversion rate of carbon monoxide to carbon dioxide may be affected by reaction temperature. As the reaction temperature decreases, the theoretical conversion rate of carbon monoxide into carbon dioxide increases. However, as the reaction temperature decreases, a reaction speed goes down. Therefore, if the reaction temperature goes down, the volume of a reactor and catalyst required to convert the same amount of carbon monoxide to carbon dioxide may increase. Considering an appropriate volume and efficiency of a WGS reactor, the WGS reaction may be performed in two steps, i.e., a high-temperature WGS reaction and a low-temperature WGS reaction. The high-temperature WGS reaction may be performed at about 300° C. to about 500° C., and the low-temperature WGS reaction may be performed at about 150° C. to about 250° C.

Figure 1:
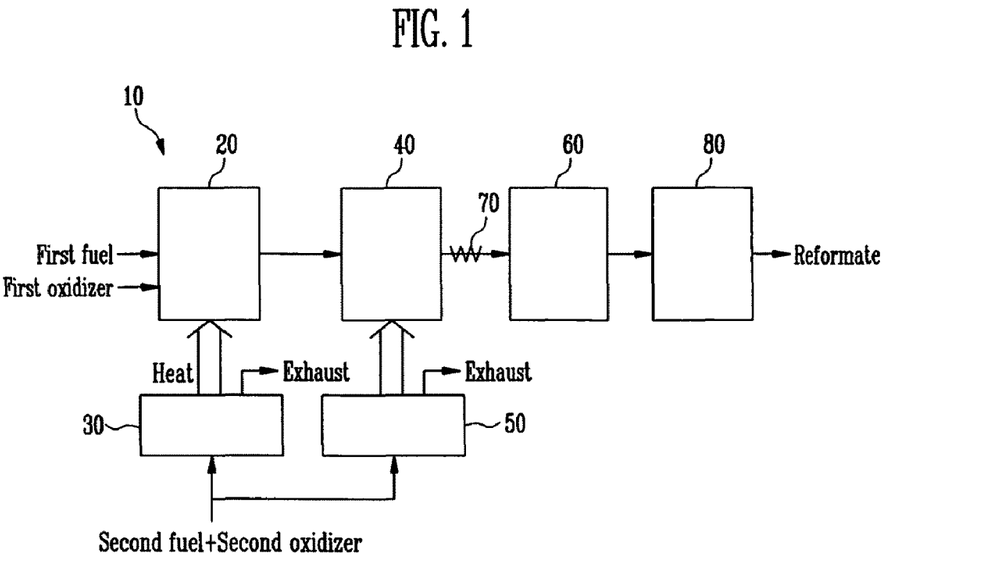
FIG. 1 illustrates a block diagram of a fuel reformer according to an embodiment.

FIG. 1 illustrates a block diagram of a fuel reformer 10 according to an embodiment. Referring to FIG. 1, the fuel reformer 10 may include a first reactor 20 reforming a first fuel to produce a first reformate R0 containing a large amount of hydrogen. The fuel reformer 10 may also include a first heat source 30 for supplying heat to the first reactor 20. The fuel reformer 10 may also include a second reactor 40 connected to the first reactor 20. The second reactor 40 may receive the first reformate R0 from the first reactor 20, and may reduce the carbon monoxide content of the first reformate R0 to form a second reformate R1. In an implementation, all of the first reformate R0 produced goes into the second reactor 40. The fuel reformer 10 may also include a second heat source 50 for supplying heat to the second reactor 40. The fuel reformer 10 may also include a third reactor 60 connected to the second reactor 40. The third reactor 60 may receive the second reformate R1 from the second reactor 50, and may reduce the carbon monoxide content of the second reformate R1 even further. In an implementation, all of the second reformate R1 goes into the third reactor 60. The fuel reformer 10 according an embodiment may be used in a fuel cell system, which may directly produce electricity through an electrochemical reaction of oxygen and hydrogen from the fuel reformer.

When air is used as an oxidizer in a reforming reaction, the first reactor 20 may be a partial oxidation (POX) reactor. When steam is used as the oxidizer, the first reactor 20 may be a steam reformer (SR). When a mixture of steam and air is used as the oxidizer, the first reactor 20 may be an autothermal reformer (ATR). The POX reformer may be small and inexpensive, and may exhibit a fast reaction time. Further, the POX reformer may be suitable for a large variety of fuels. The SR may be suitable for a high-efficiency system.

In an embodiment, the first reactor 20 may include a first catalyst, which catalyzes a reforming reaction of the first fuel. The first catalyst may be disposed in the first reactor 20 to have a configuration and volume corresponding to a predetermined gas hourly space velocity (GHSV) of, e.g., about 2,000/hr to about 40,000/hr. A reaction temperature of the first reactor 20 may be about 150° C. to about 850° C. The first catalyst may be formed of unit catalysts. Unit catalysts may be, e.g., formed by coating a catalyst material on a monolithic support body, or formed in a pellet shape. The first catalyst may include, e.g., Cu—Zn, Ni/Al$_2$O$_3$, Ru/ZrO$_2$, Ru/Al$_2$O$_3$/ Ru/CeO$_2$—Al$_2$O$_3$, and combinations thereof.

The first fuel may include, e.g., coal gas, natural gas, biomass, methanol, ethanol, gasoline, and the like. The first fuel may include a liquefied gas, which is in a gaseous state at standard temperature and pressure (STP). The first fuel may include, e.g., methane, ethane, propane, or butane, as a main component. Steam may be used as a first oxidizer of the first fuel.

The first heat source 30 may be thermally connected to the first reactor 20, so as to supply heat to the first reactor 20. The first heat source 30 may include, e.g., a burner or an oxidation reaction unit using a catalyst oxidation method. When the catalyst oxidation method heater is used as the first heat source 30, the first heat source 30 may include an oxidation catalyst.

A second fuel, for use in the first heat source 30, may include, e.g., methane, ethane, propane, or butane, as a main component. Air may be used as a second oxidizer of the second fuel.

The second reactor 40 may convert carbon monoxide in the first reformate R0 into hydrogen and carbon dioxide. The second reactor 40 may include a second catalyst. The second catalyst may be disposed in the second reactor 40 to have a configuration and volume corresponding to a predetermined GHSV of, e.g., about 220,000/hr to about 240,000/hr. In an implementation, the flow rate (volume/hour at standard temperature and pressure) may be the same in the first reactor 20 and the second reactor 40. The reaction temperature of the second reactor 40 may be about 600° C. to 850° C. The second catalyst may be formed of unit catalysts. The unit catalysts may be, e.g., formed by coating a catalyst material on a monolithic support body, or formed in a pellet shape. The catalyst material of the second catalyst may include an additive, e.g., an alkali metal, etc.

The second heat source 50 may be thermally connected to the second reactor 40, so as to supply heat to the second reactor 40. The second heat source 50 may include, e.g., a burner or an oxidation reaction unit using a catalyst oxidation method. When the catalyst oxidation method heater is used as the second heat source 50, the second heat source 50 may include an oxidation catalyst.

The third reactor 60 may further reduce the carbon monoxide content in the second reformate R1 from the second reactor 40. The third reactor 60 may include a third catalyst. The third catalyst may be disposed in the third reactor 60 to have a configuration and volume corresponding to a predetermined GHSV of, e.g., about 2,000/hr to about 40,000/hr. In an implementation, the flow rate (volume/hour at standard temperature and pressure) may be the same in the first reactor 20, the second reactor 40, and the third reactor 60. The reaction temperature of the third reactor 60 may be about 150° C. to about 250° C. The third catalyst may be formed of unit catalysts. The unit catalysts may be, e.g., formed by coating a catalyst material on a monolithic support body, or formed in a pellet shape. The third catalyst may include, e.g., Cu, ZnO, $Al_2O_3$, and the like.

The configuration and operation of the fuel reformer 10 according to an embodiment will be more clearly understood through the following experimental process.

A stainless steel first reactor was prepared, and a first reformate R0 was produced using methane ($CH_4$) as the first fuel. The reaction conditions were as follows: the first fuel (methane) was introduced at 600 standard cubic centimeters per minute (sccm) to the first reactor, and water (steam) as a first oxidizer was introduced at 6 sccm to the first reactor. A second fuel was introduced at 480 sccm to the first heat source 30, and air as a second oxidizer was introduced at 19 L/min to the first heat source 30. The first reformate R0 was produced by the first reactor at a rate of 8.3 L/min. The first reformate R0 produced in the first reactor had a composition of: 10.81% CO, 14.2% $CO_2$, 0.33% $CH_4$, and 76.8% $H_2$.

A ⅜-inch reactor including a second catalyst using a 45 cm flexible tube was prepared as the second reactor 40. The second catalyst was prepared by coating about 2.0 cc of a catalyst material on a 400 mesh, 8 cm monolithic support body and inserting the coated body into the flexible tube. The second catalyst included platinum (Pt), cerium (Ce), magnesium (Mg), and potassium ion ($K^+$). The second catalyst included platinum as a main catalyst and cerium as a promoter, similar to a typical WGS catalyst. The magnesium and potassium ion were included as additives.

Then, all of the first reformate R0 from the first reactor 20 was supplied to the second reactor 40 at a rate of 8.3 L/min. The carbon monoxide content in the first reformate R0 was about 10.81%. The reaction temperature of the second reactor 40 was controlled by the second heat source 50. The activation of the second catalyst was measured at different reaction temperatures of the second reactor 40 in 50° C. increments between 600° C. to 850° C., i.e., at 600, 650, 700, 750, 800, and 850° C. After an equilibrium time of about 20 minutes elapsed at each of the set temperatures, the activation of the second catalyst was measured. The second reformate R1 from the second reactor 40 was analyzed using a gas analyzer and a wet gas meter. The results are shown in Table 1 of FIG. 6.

Figure 6:
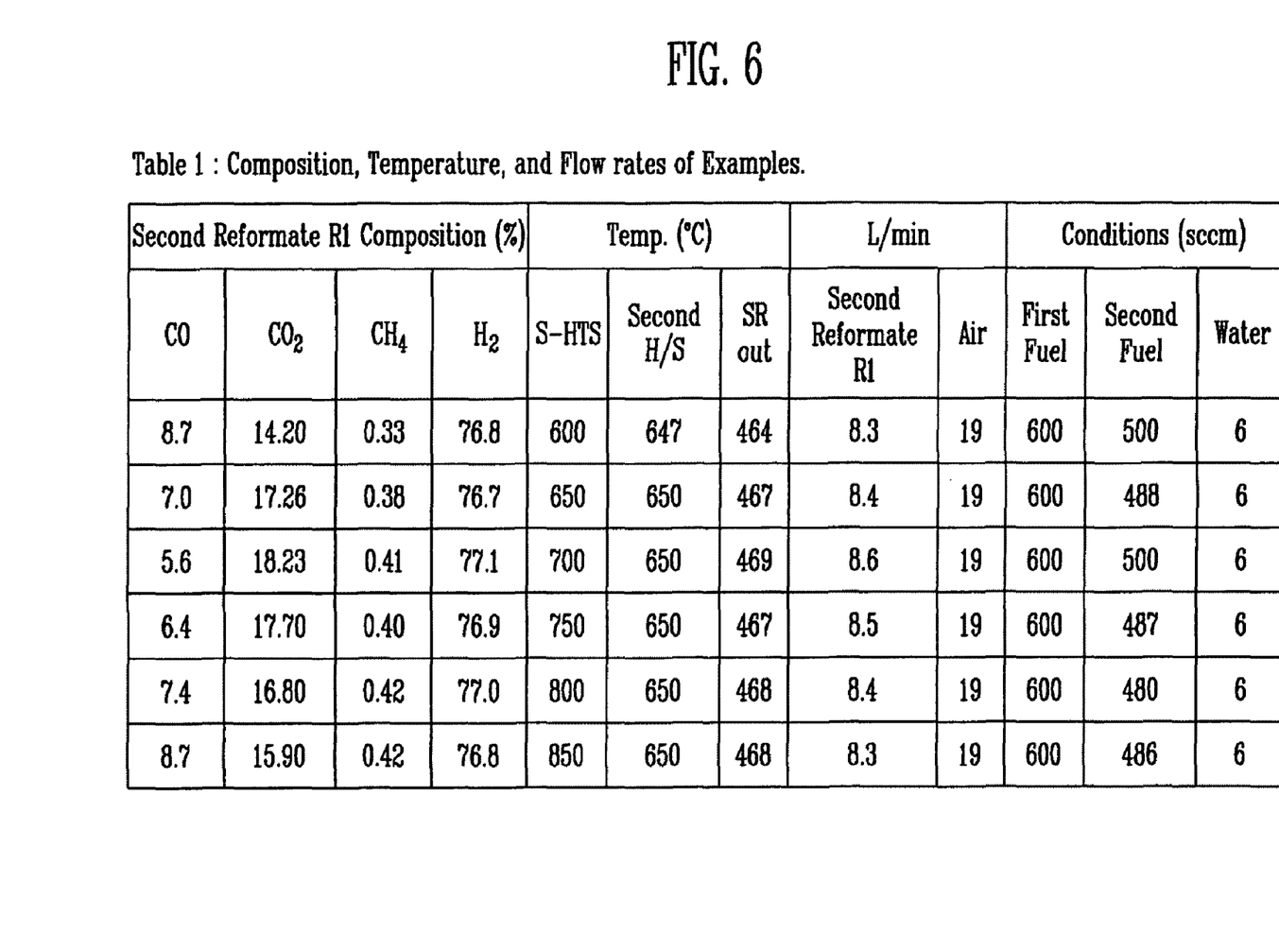
FIG. 6 illustrates Table 1, showing a second reformate composition, temperatures, flow rates, and conditions of an experiment.

Table 1 shows the second reformate composition, temperatures for main components of the fuel reformer 10, flow rates of the second reformate from the second reactor and air into the first heat source in L/min, and reforming reaction conditions of steam used in the first reactor 20. In the "Temp. (° C.)" columns of Table 1, "S-HTS" denotes the temperature of the second reactor 40, "Second H/S" denotes the temperature of the second heat source 50, and "SR out" denotes the temperature of the reformate from the first reactor 20. In the "Conditions (sccm)" columns of Table 1, "First Fuel" denotes the flow rate of the first fuel supplied to the first reactor 20, and "Second Fuel" denotes the flow rate of the second fuel supplied to the first heater 30.

Figure 2:
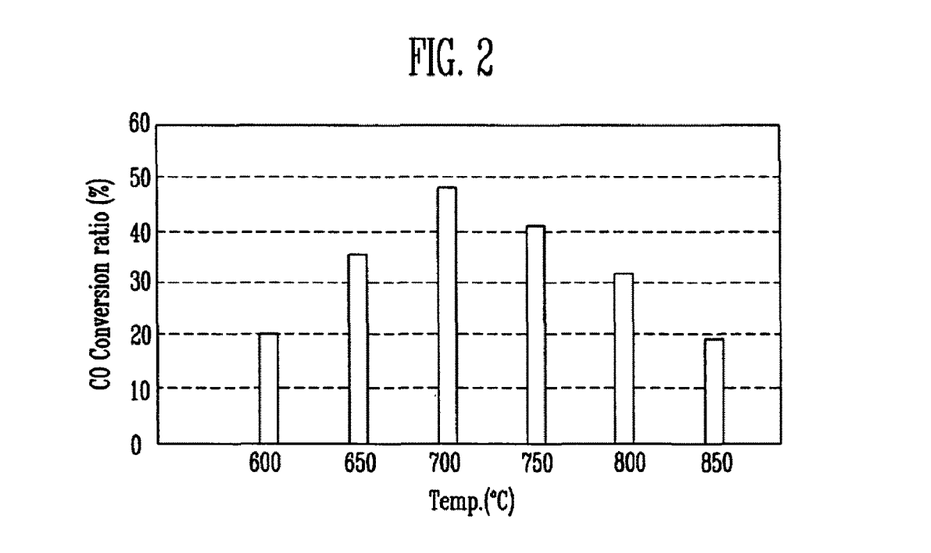
FIG. 2 illustrates a graph showing the conversion ratio of carbon monoxide into carbon dioxide in the fuel reformer of FIG. 1.

As seen in Table 1, the carbon monoxide content of the first reformate R0 was lowered from about 10.81% down to about 5.6 to about 8.7% in the second reformate R1. In other words, as shown in FIG. 2, the conversion rate of carbon monoxide into carbon dioxide by the second catalyst was about 20% at 600° C., about 36% at 650° C., about 48% at 700° C., about 41% at 750° C., about 32% at 800° C., and about 20% at 850° C.

The second catalyst produced the second reformate R1 having a hydrogen gas content of about 77.1%, and a carbon monoxide content of about 5.6% at 700° C., showing the highest activation. Accordingly, the second catalyst showed the highest conversion rate of carbon monoxide into carbon dioxide at about 70° C.

According to the experiment, it may be seen that a small amount of a typical WGS catalyst having a reaction temperature of about 150° C. to about 450° C. may be used at a reaction temperature of about 600° C. to about 850° C. upon the addition of the additive, e.g., cesium (Cs), magnesium (Mg), potassium (K), calcium (Ca), and/or fluorine (F). This relatively high temperature may thereby obtain a desired activation of the catalyst. The second catalyst exhibited little difference in activation when the reaction temperature was about 600° C. to about 850° C.

The ability to use a small amount of second catalyst may be implemented by using the principle in which, as the GHSV of the second catalyst is increased, i.e., the volume of the catalyst is lowered, the reaction temperature is also increased. The GHSV refers to a flow volume of a reactant per unit volume of a reactor, i.e., a flow rate of a reactant passing per catalyst unit volume. At a given flow rate, the GHSV is determined by the volume of catalyst in the reactor. A super-high-temperature shift reaction (S-HTS) may be performed by controlling reaction conditions of a WGS catalyst at a reaction temperature of about 600° C. to about 850° C.

According to the present embodiment, the amount of the third catalyst used may be reduced considerably, e.g., by about half in the third reactor 60, compared to a typical fuel reformer. The third reactor 60 may reduce the carbon monoxide content of the second reformate R1 from the second reactor 40 to about 5% or lower. The third catalyst may be a WGS catalyst having a reaction temperature of about 150° C. to about 250° C. The third catalyst may include, e.g., Cu, ZnO, $Al_2O_3$, and the like.

The fuel reformer 10 according to the present embodiment may also include a heat exchanger 70 disposed between the second and third reactors 40 and 60. The heat exchanger 70 may be operated so that the second reformate R1 from the second reactor 40 is introduced into the third reactor 60 at a suitable temperature. The fuel reformer 10 may also include a reformate purifier 80. The reformate purifier 80 may be a selective or preferential oxidation (PROX) reactor. A reformate from the reformate purifier 80 may have a carbon monoxide content of less than about 1%, or below 10 ppm, and may thereby be used in a fuel cell having a precious metal, e.g., platinum, as an electrode. Maintaining the carbon monoxide content below about 10 ppm may be beneficial because carbon monoxide may stick to the surface of platinum, and make it less effective over time.

Figure 3:
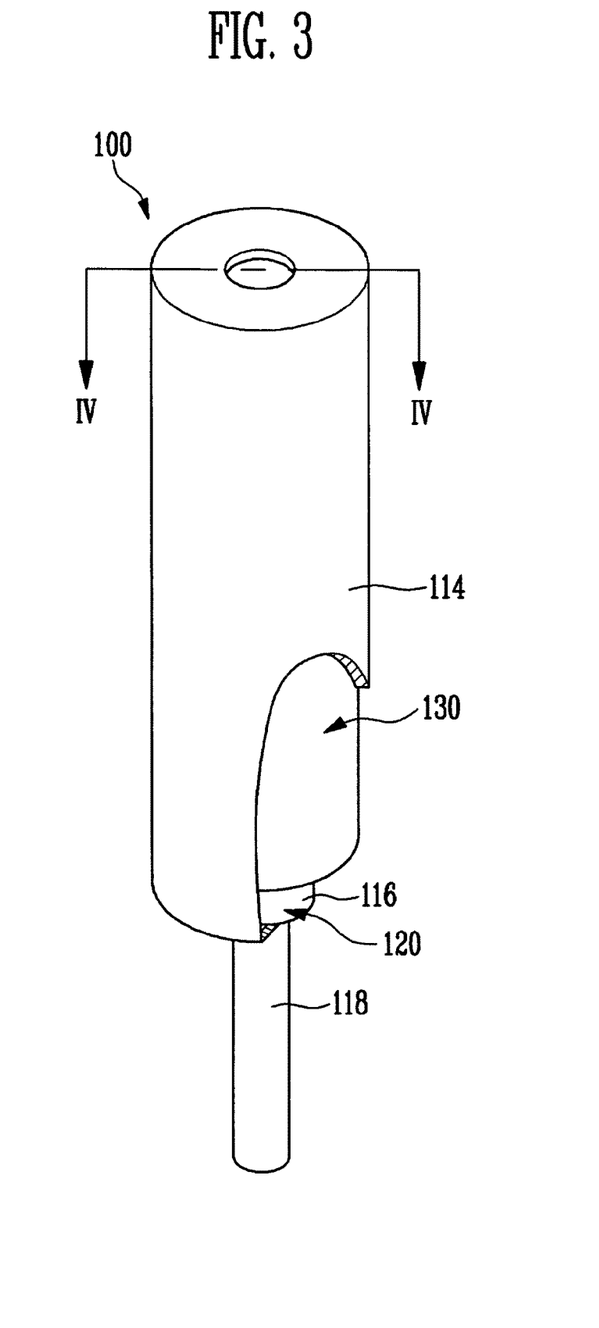
FIG. 3 illustrates a perspective view of a fuel reformer according to another embodiment.
Figure 4:
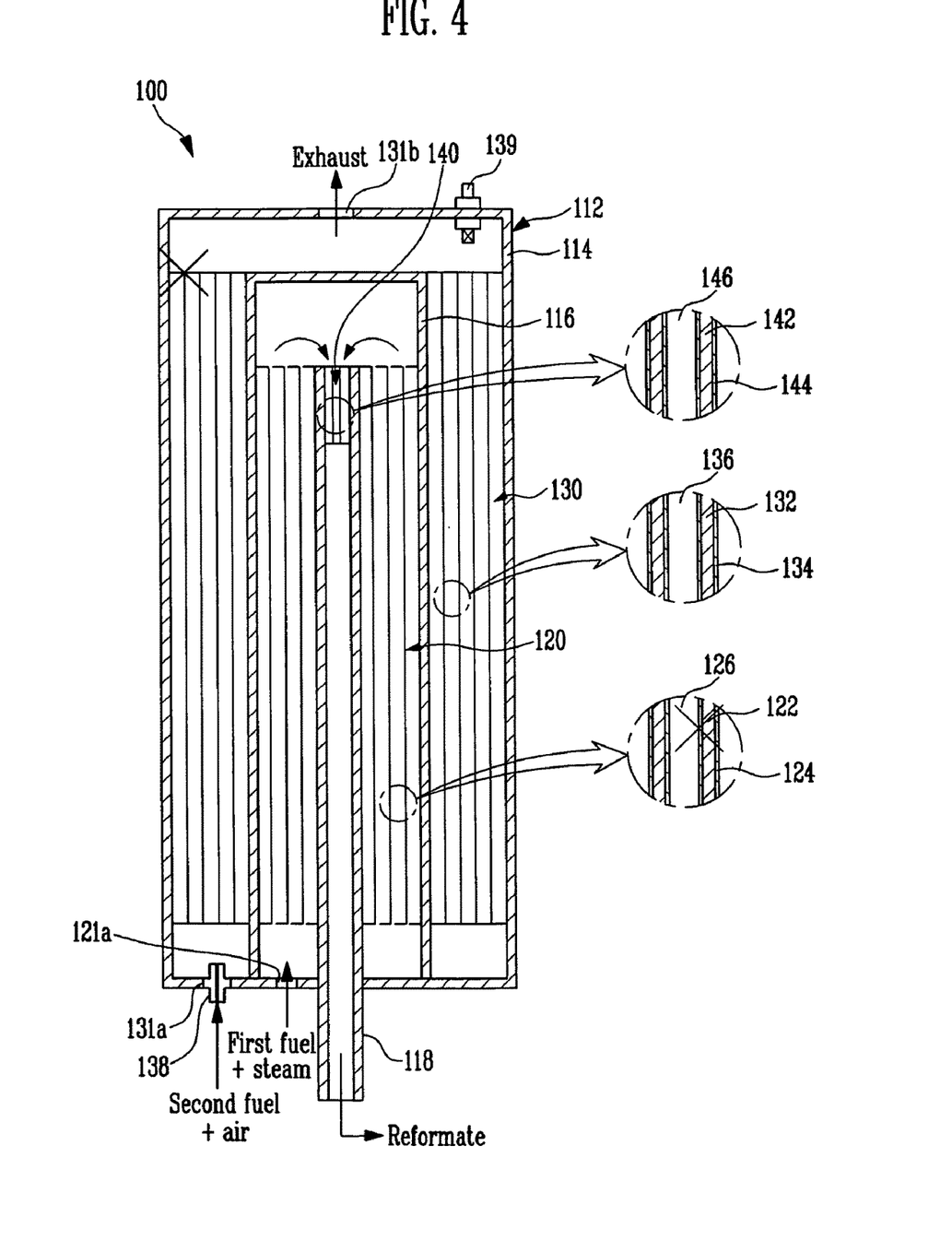
FIG. 4 illustrates cross-sectional view of the fuel reformer taken along line IV-IV of FIG. 3.

FIG. 3 illustrates a perspective view of a fuel reformer according to another embodiment. FIG. 4 illustrates a cross-sectional view of the fuel reformer taken along line IV-IV of FIG. 3. Referring to FIGS. 3 and 4, the fuel reformer 100 according to the present embodiment may include a housing 112, a first reactor 120, a heat source 130, and a second reactor 140.

The housing 112 may have a predetermined sectional area, and ends of the housing 112 may be substantially closed. The housing 112 may have a triple tube structure including a plurality of openings through which a fluid may flow. The housing 112 may be formed of, e.g., a metal or non-metal material having insulation. The housing 112 may include a first housing 114, a second housing 116, and a third housing 118.

The first housing 114 may have a pipe shape having a predetermined first sectional area. Ends of the first housing 114 may be substantially closed. The second housing 116 may have a pipe shape having a second sectional area smaller than the first sectional area. Ends of the second housing 116 may be substantially closed. The second housing 116 may be surrounded by the first housing 114. The first housing 114 may be spaced apart at a predetermined distance from an outer circumferential surface of the second housing 116. The third housing 118 may have a pipe shape having a third sectional area smaller than the second sectional area. Ends of the third housing 118 may be substantially open. The third housing 118 may be surrounded by the second housing 116. The second housing 116 may be spaced apart from the third housing 118 by a predetermined distance from an outer circumferential surface of the third housing 118.

A space between the first and second housings 114 and 116 may form a first chamber for the heat source 130. A space between the second and third housings 116 and 118 may form a second chamber for the first reactor 120. The second reactor 140 may be disposed in an internal space of the third housing 118.

The first reactor 120 may produce a first reformate R1 having a carbon monoxide content of about 10%. The first reactor 120 may receive heat energy from the heat source 130 and perform a steam reforming reaction with the first fuel. The first reactor 120 may include at least one first opening 121a through which the first fuel and steam are introduced into the first reactor 120. The first reactor 120 may include at least one second opening through which the reformate produced by the steam reforming reaction is discharged from the first reactor 120 into the second reactor 140.

The first reactor 120 may include a first catalyst, e.g., of a ceramic or metal monolithic type, disposed in the second chamber. The first catalyst may include a first support body 122 having a plurality of passages 126, and an active material or a first catalyst material 124 incorporated into the first support body 122. A cell density of the monolithic first support body 122 may be about 50 to about 1200 cells/square inch. The first support body 122 may include, e.g., alumina ($Al_2O_3$), silica ($SiO_2$), or titania ($TiO_2$). The first catalyst material 124 may include, e.g., Cu—Zn, $Ni/Al_2O_3$, $Ru/ZrO_2$, $Ru/Al_2O_3/Ru/CeO_2$—$Al_2O_3$, and combinations thereof.

The heat source 130 may generate heat and ignition gas by oxidizing the second fuel, and may supply the generated heat energy to the first and second reactors 120 and 140. The heat source 130 may include at least one first opening 131a through which the second fuel and air are introduced into the heat source 130. The heat source 130 may include at least one second opening 131b through which the ignition gas generated in the oxidation reaction of the second fuel is discharged from the heat source 130.

A nozzle 138 may be disposed in the first opening 131a of the heat source 130. The nozzle 138 may allow injection of the second fuel into the heat source 130. The heat source 130 may include an igniter 139. The igniter 139 may ignite the second fuel and an oxidizer by, e.g., an electric spark.

The heat source 130 may be an oxidation reactor using a catalyst oxidation method and may have, e.g., a ceramic or metal, monolithic oxidation catalyst having a plurality of passages 136. The oxidation catalyst may include a support body 132 and an oxidation catalyst material 134 incorporated into the support body 132. The support body 132 may include, e.g., alumina ($Al_2O_3$), silica ($SiO_2$) or titania ($TiO_2$). The oxidation catalyst material 134 may include, e.g., $PdAl_2O_3$, NiO, CuO, $CeO_2$, $Al_2O_3$, Pu, Pd, Pt, and combinations thereof. Alternatively, the oxidation catalyst may be implemented using a solid phase crystallization (SPC) method of sintering and deoxidizing a crystalline precursor homogeneously containing an active metal species.

The second reactor 140 may receive heat energy from the heat source 130, and reduce the carbon monoxide content of the first reformate R0 from about 10% down to about 5% to 8%. The second reactor 140 may be disposed in an internal space of the third housing 118. An end of the third housing 118 may be connected to the second opening of the first reactor 120 so that all fluid (i.e., reformate) exiting the first reactor 120 may flow through the second opening in the second reactor 140. Another end of the third housing 118 may be exposed to the outside of the housing 112. The second reformate R1 from the second reactor 140 may be supplied to a fuel cell stack through the pipe-shaped third housing 118.

The second reactor 140 may have a second catalyst of, e.g., a ceramic or metal monolithic type, disposed in the third housing 118. The second catalyst may include a second support body 142 having a plurality of passages 146, and a second catalyst material 144 incorporated into the second support body 142. In addition to the materials described above with respect to the experiment, the second catalyst may include, e.g., $Cr_2O_3$, $Fe_3O_4$, Cu, ZnO, $Al_2O_3$, $Ni/Al_2O_3$, and/or $Ru/Al_2O_3$, incorporated into a support body including, e.g., ($Al_2O_3$), silica ($SiO_2$), or titania ($TiO_2$).

According to the present embodiment, reaction temperatures of the first and second reactors 120 and 140 may be controlled using the single heat source 130, so that heat efficiency may be improved, and an additional heat source may be omitted. This may thereby minimize the overall size of a device including the fuel reformer 100. Further, it may be possible to reduce the amount of a catalyst used in a carbon monoxide reducing unit, i.e., a third reactor, by about half when compared to a typical carbon monoxide reducing unit. The carbon monoxide reducing unit may reduce the carbon monoxide content of the second reformate R1 from the second reactor 140 to about 5% or less. For example, in a low-temperature WGS reactor corresponding to the third reactor 60 of FIG. 1, the amount of a WGS catalyst used may be reduced by about half, when compared to a typical third reactor WGS catalyst. Accordingly, an operation time of the device may be shortened, and the flow of air required to preheat the fuel reformer 100 may be reduced. Further, the amount of the catalyst used may be reduced, thereby lowering manufacturing cost of the fuel reformer 100.

Figure 5:
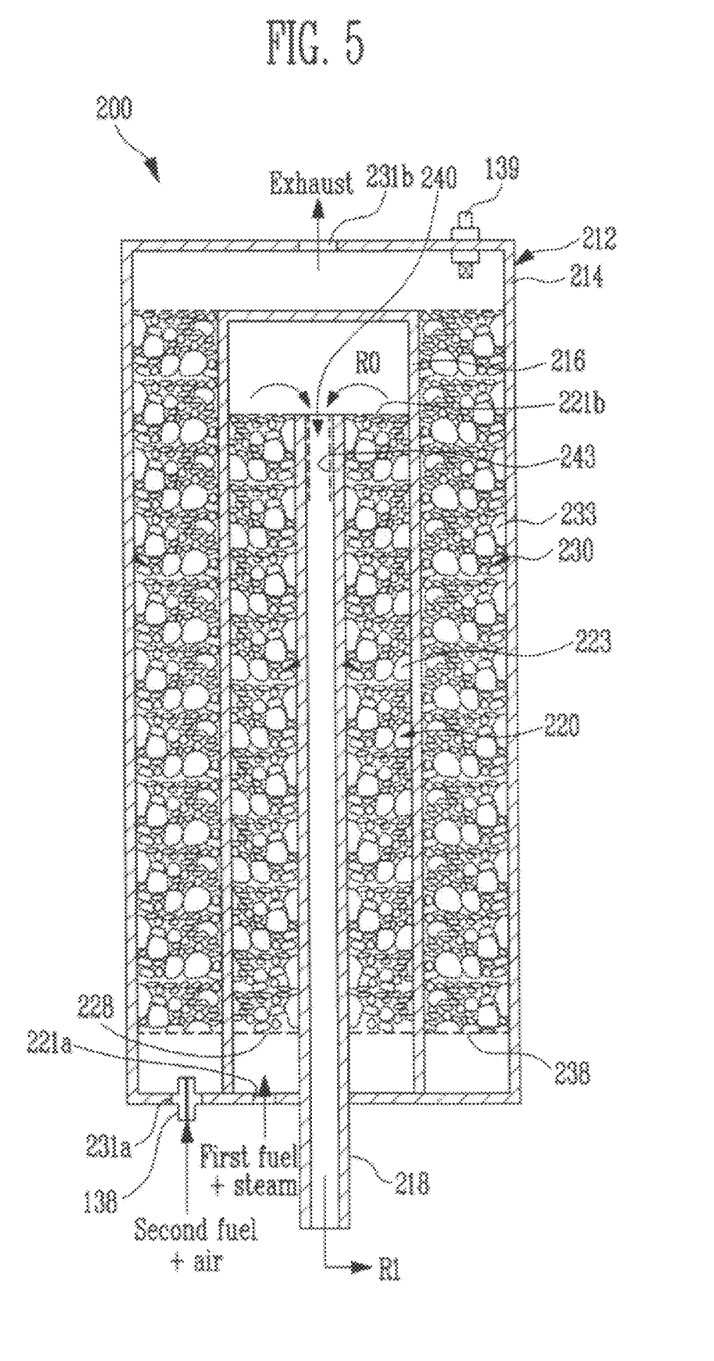
FIG. 5 illustrates a cross-sectional view of a fuel reformer according to yet another embodiment.

FIG. 5 illustrates a cross-sectional view of a fuel reformer according to yet another embodiment. Referring to FIG. 5, the fuel reformer 200 according to the present embodiment may include a housing 212 having at least one chamber disposed therein, a first reactor 220 disposed in the housing 212, a heat source 230, and a second reactor 240. The housing 212 may include a first housing 214, a second housing 216, and a third housing 218, forming a triple tube structure.

The first reactor 220 may produce a first reformate R0 by, e.g., a steam reforming reaction with a first fuel. The first reactor 220 may include a plurality of openings 221a through which a fluid is introduced into the first reactor 220. The first reactor 220 may include a first catalyst 223 disposed in a space between the third and second housings 218 and 216. The first catalyst 223 may be formed of unit catalysts having a granular shape. The granular shape refers to a shape, e.g., a pellet, a bead, an egg shell, or combinations thereof. A reticular body 228 surrounding the first catalyst 223 may be disposed in the first reactor 220 to prevent scattering of the first catalyst 223.

The heat source 230 may supply heat energy to the first and second reactors 220 and 240. The heat source 230 may include a plurality of openings 231a and 231b through which a fluid is introduced into, or discharged from (respectively), the heat source 230. The heat source 230 may include, e.g., an oxidation catalyst, disposed in a space between the second and first housing 216 and 214. The oxidation catalyst 233 may be formed of unit catalysts having a granular shape. A reticular body 238 surrounding the oxidation catalyst 233 may be disposed in the heat source 230 to prevent scattering of the oxidation catalyst 233. The reaction temperatures of the first and second reactors 220 and 240 may be controlled by the heat source 230. Alternatively, the first catalyst 223 and/or the oxidation catalyst 233 may be disposed in each of the chambers while being filled in a plurality of tubular reactors.

The second reactor 240 may be disposed in the tubular third housing 218 and connected to first reactor 220, so that a fluid may exit the first reactor 220 via openings 221b and then flow through the third housing 218. An end of the third housing 218 may be connected to the first reactor 220, and another end of the third housing 218 may extend to the outside of the housing 212, so that the second reformate R1 may be discharged from the third housing 218.

The second reactor 240 may include a second catalyst 243, and may lower the carbon monoxide content in the first reformate R0 from the first reactor 220 by a predetermined amount through a WGS reaction. A predetermined amount of the second catalyst 243 may be coated on a region of an inner surface of the third housing 218. For example, when the total amount of a WGS catalyst used at a rear end of the first reactor 220 is 150 cc, about 2 cc of the second catalyst may be used. 2 cc of the second catalyst may correspond to a GHSV of the second reactor 240 of about 220,000/hr to about 240,000/hr. The reaction temperature of the second reactor 240 may be controlled from about 600° C. to about 850° C.

The second catalyst 243 may include a typical high-temperature WGS catalyst having a reaction temperature of about 350° C. to about 450° C., or a general low-temperature WGS catalyst having a reaction temperature of about 150° C. to about 250° C. However, the additive may be added to the typical WGS catalyst, e.g., a WGS catalyst using platinum (Pt) as a main catalyst, to make the catalyst suitable for a reaction temperature of about 600 to 850° C. As described above, the additive may include, e.g., cesium (Cs), magnesium (Mg), potassium (K), calcium (Ca), and/or fluorine (F).

When using a WGS catalyst to which the additive is added, carbon dioxide from carbon monoxide may be rapidly attached/detached, thereby obtaining high selectivity.

If the concentration of carbon monoxide in the second reactor 240 is lowered by a predetermined value, e.g., from about 10.8% down to about 8.7 to about 7.1%, the amount of a catalyst needed in a carbon monoxide reducing unit (see third reactor 60 of FIG. 1) disposed at a rear end of the second reactor 240 may be considerably decreased. For example, the amount of the low-temperature WGS catalyst used may be lowered from, e.g., about 200 cc to about 150 cc in a typical carbon monoxide reducing unit, down to about 90 cc.

According to the present embodiment, the amount of WGS catalyst used in the carbon monoxide reducing unit may be decreased, so that a preheating time of the carbon monoxide reducing unit disposed at the rear end of the second reactor 240 may be considerably shortened, e.g., from about 7 to 8 minutes down to about 3 to 4 minutes.

In the aforementioned embodiments, the fuel reformer may further include an evaporator connected to a front end of the first reactor to supply the first fuel and water or steam to the first reactor. The evaporator may be disposed to receive heat from the single heat source shown in FIG. 3, or may be coupled to the fuel reformer as a separate device.

Since the reaction temperature of a low-temperature WGS reactor may be relatively low, the low-temperature WGS reactor in a typical fuel reformer may have the largest volume. In other words, in the typical fuel reformer, a relatively large amount of catalyst may be used due to the low reaction temperature of the low-temperature WGS reactor. For example, in the typical fuel reformer, the amount of WGS catalyst in the low temperature WGS reactor may occupy about 50% of the volume of total catalyst in the entire fuel reformer. Therefore, since a large amount of catalyst is necessarily heated when the typical fuel reformer is operated, preheating time may be long, and energy consumption may be increased. The typical low-temperature WGS catalyst may include, e.g., platinum and cerium.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A fuel reformer, comprising:
   a reaction container including a first chamber;
   a first reactor in the first chamber, the first reactor:
       including a first catalyst,
       being configured to produce a first reformate by performing a steam reforming reaction on a first fuel, and
       having a first volume and a first gas hourly space velocity (GHSV), the first GHSV being calculated by dividing a set flow rate by the first volume;
   a first heat source thermally connected to the first reactor;
   a second reactor connected to the first reactor, the second reactor:
       including a second catalyst,
       being configured to produce a second reformate having a lower carbon monoxide content than the first reformate, and
       having a second volume and a second GHSV greater than the first GHSV, the second GHSV being calculated by dividing the set flow rate by the second volume; and a third reactor connected to the second reactor, the third reactor:
- including a third catalyst,
- being configured to produce a third reformate having a lower carbon monoxide content than the second reformate, and
- having a third volume and a third GHSV lower than the second GHSV, the third GHSV being calculated by dividing the set flow rate by the third volume.

2. The fuel reformer as claimed in claim 1, wherein the second catalyst includes an additive, the additive including at least one of cesium, magnesium, potassium, calcium, and fluorine.

3. The fuel reformer as claimed in claim 2, wherein the second GHSV is about 220,000/hr to about 240,000/hr and the first GHSV is about 2,000/hr to about 40,000/hr, and the second reactor receives all output of the first reactor.

4. The fuel reformer as claimed in claim 2, wherein the second reactor has a reaction temperature of about 600° C. to about 850° C.

5. The fuel reformer as claimed in claim 2, wherein the first fuel is a liquefied gas hydrocarbon-based fuel that is in a gaseous state at standard temperature and pressure.

6. The fuel reformer as claimed in claim 2, wherein the first fuel includes a majority of at least one of methane, ethane, propane, and butane.

7. The fuel reformer as claimed in claim 2, further comprising a second heat source thermally connected to the second reactor, wherein the second reactor is disposed outside the reaction container.

8. The fuel reformer as claimed in claim 2, wherein the second reactor is disposed adjacent to the first reactor and thermally connected to the first heat source.

9. The fuel reformer as claimed in claim 2, wherein the first or second catalyst is formed of unit catalysts having a pellet shape.

10. The fuel reformer as claimed in claim 2, wherein the first or second catalyst includes a monolithic support body coated with a catalyst material.

11. The fuel reformer as claimed in claim 10, wherein the second catalyst includes a platinum main catalyst, a cerium promoter, and magnesium and potassium additives.

12. The fuel reformer as claimed in claim 1, wherein the third GHSV is about 2,000/hr to about 40,000/hr, and the third reactor receives all output of the second reactor.

13. The fuel reformer as claimed in claim 1, wherein the third reactor has a reaction temperature of about 150° C. to 250° C.

14. The fuel reformer as claimed in claim 13, further comprising a heat exchanger disposed between the second and third reactors.

15. The fuel reformer as claimed in claim 1, wherein the third catalyst includes a majority of at least one of copper, zinc oxide, and aluminum oxide.

16. The fuel reformer as claimed in claim 1, further comprising a reformate purifier connected to the third reactor.

* * * * *